(12) United States Patent  (10) Patent No.: US 7,451,951 B2
Perlman  (45) Date of Patent: Nov. 18, 2008

(54) MINIATURE AIRPLANE APPARATUS AND METHOD

(75) Inventor: Stephen G. Perlman, Palo Alto, CA (US)

(73) Assignee: Rearden, LLC, San Francisco, CA (US)

( * ) Notice: Subject to any disclaimer, the term of this patent is extended or adjusted under 35 U.S.C. 154(b) by 0 days.

(21) Appl. No.: 11/326,790

(22) Filed: Jan. 5, 2006

(65) Prior Publication Data

US 2006/0266884 A1 Nov. 30, 2006

Related U.S. Application Data

(62) Division of application No. 10/335,374, filed on Dec. 30, 2002, now abandoned.

(51) Int. Cl.
B64C 13/50 (2006.01)
B64C 13/20 (2006.01)

(52) U.S. Cl. ...................... 244/228; 244/189

(58) Field of Classification Search ........ 244/228, 244/75 R, 232, 221, 189, 190; 273/362; 434/14, 22
See application file for complete search history.

(56) References Cited

U.S. PATENT DOCUMENTS

| 2,315,110 | A | | 3/1943 | Dornier |
| 2,381,721 | A | | 8/1945 | Carroll |
| 2,611,563 | A | | 9/1952 | Ross |
| 2,781,182 | A | | 2/1957 | Ross |
| 2,938,201 | A | * | 5/1960 | Thornton ............... 342/52 |
| 3,016,215 | A | * | 1/1962 | Ross ................... 244/232 |
| 3,058,697 | A | | 10/1962 | Tribken |
| 4,443,014 | A | * | 4/1984 | Kovit et al. ............ 273/363 |
| 4,652,917 | A | * | 3/1987 | Miller ................. 348/135 |
| 4,929,949 | A | | 5/1990 | Yamamoto et al. |
| 4,964,598 | A | | 10/1990 | Berejik et al. |
| 5,002,490 | A | * | 3/1991 | Blackstone ............. 434/14 |
| 5,015,187 | A | * | 5/1991 | Lord ................... 434/33 |
| 5,091,637 | A | * | 2/1992 | Edwards ............. 250/203.6 |
| 5,228,854 | A | * | 7/1993 | Eldridge ............... 434/11 |
| 5,580,311 | A | * | 12/1996 | Haste, III ............. 463/17 |
| 5,752,672 | A | | 5/1998 | McKillip, Jr. |
| 5,755,408 | A | * | 5/1998 | Schmidt et al. ......... 244/204 |
| 5,971,328 | A | | 10/1999 | Kota |
| 6,474,593 | B1 | | 11/2002 | Lipeles et al. |

\* cited by examiner

*Primary Examiner*—Tien Dinh
(74) *Attorney, Agent, or Firm*—Blakely, Sokoloff, Taylor & Zafman, LLP

(57) ABSTRACT

An apparatus is described comprising: an aircraft having one or more control surfaces; and one or more micro-electro mechanical systems ("MEM S") actuators to control the movement of the one or more control surfaces.

2 Claims, 17 Drawing Sheets

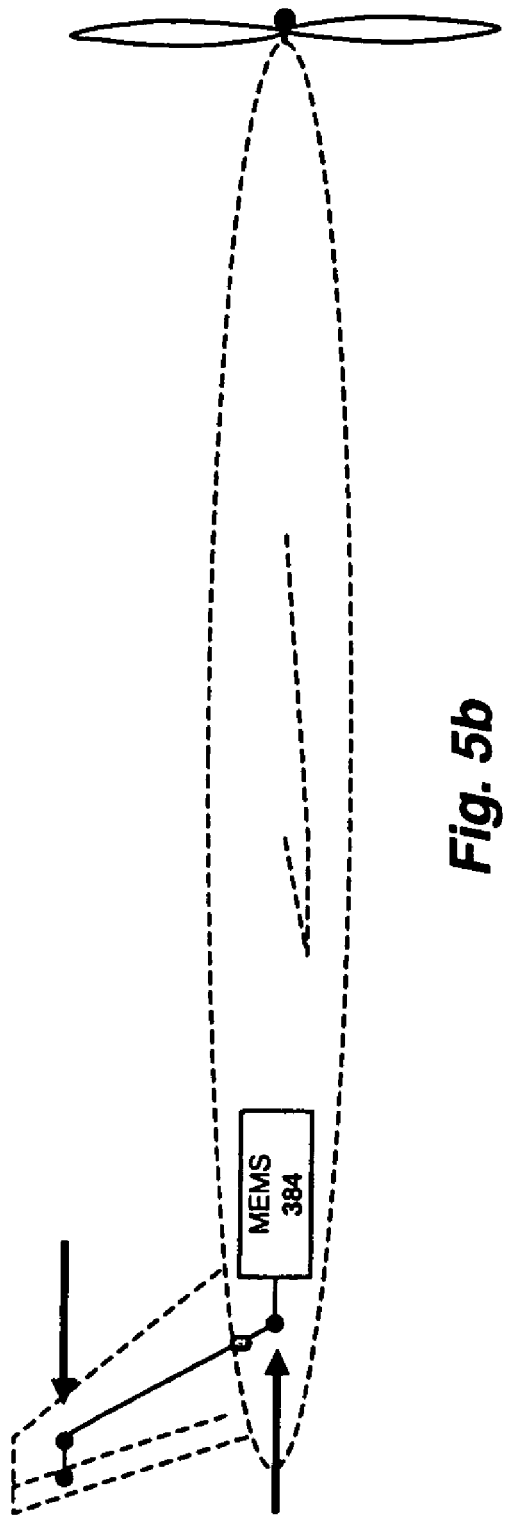
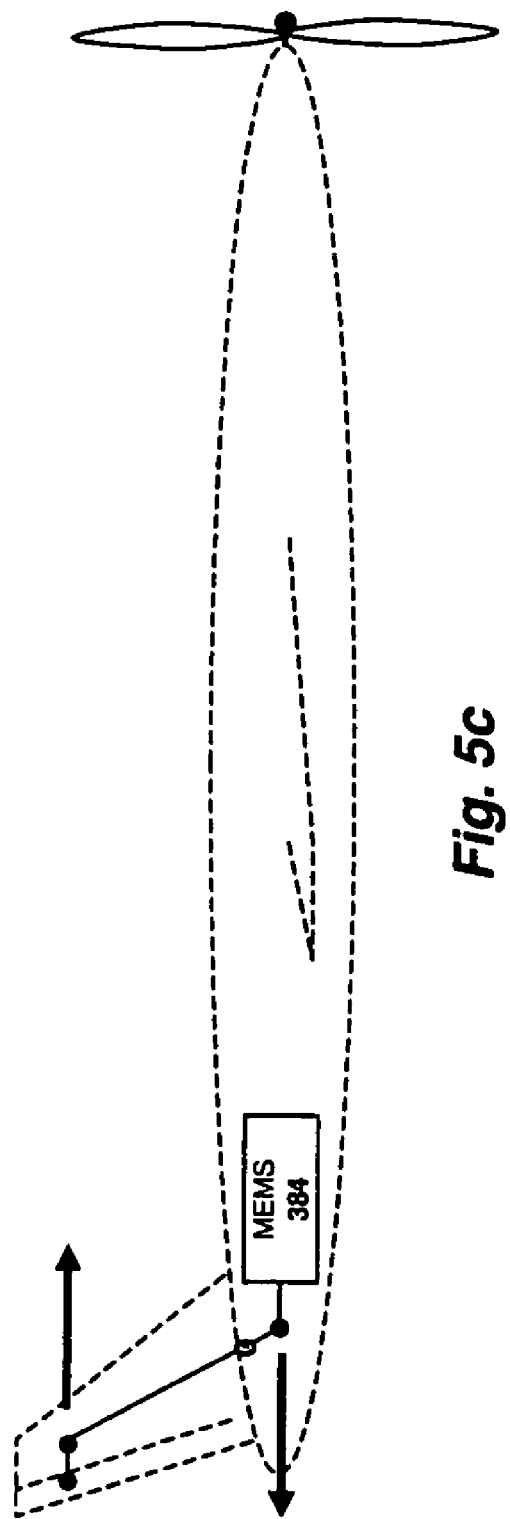

MINIATURE AIRPLANE APPARATUS AND METHOD

This application is a Divisional application of U.S. patent application Ser. No. 10/335,374, filed Dec. 30, 2002 now abandoned.

BACKGROUND OF THE INVENTION

1. Field of the Invention

This invention relates generally to the field of aeronautical control systems. More particularly, the invention relates to a miniature aircraft and an apparatus and method for controlling a miniature aircraft.

2. Description of the Related Art

Aeronautical Control Surfaces

There are typically three different types of aeronautical control surfaces on an airplane: the ailerons, the elevators, and the rudder. Ailerons are the movable sections cut into the trailing edges of the wings. These are used as the primary directional control and they accomplish this by controlling the roll of the plane (i.e., tilting the wing tips up and down). Ailerons typically operate in opposite directions on each side of the plane. To roll the plane to the right, the left aileron is deflected down (creating more lift on this side) and the right aileron is deflected up (creating less lift on this side). The difference in lift between the two sides causes the plane to rotate about its long axis.

The elevator is the movable horizontal wing-like structure on the tail of the airplane. It is used to control the pitch of the plane, allowing the pilot to point the nose of the plane up or down as required.

The rudder is the vertical wing-like structure on the tail. It is used to control the yaw of the aircraft by allowing the pilot to point the nose of the plane left or right.

For both real airplanes and hobby airplanes, the actuation used to control each of these control surfaces is typically accomplished via an electric motor enclosed within the wings or the fuselage of the airplane.

Micro-Electro Mechanical Systems

Micro-Electro Mechanical Systems ("MEMS") are semiconductor chips that have a top layer comprised of mechanical devices such as mirrors or fluid sensors. MEMS technology has been under development since the 1980s, and MEMS devices began to materialize as commercial products in the mid-1990s. They are currently used to make pressure, temperature, chemical and vibration sensors, light reflectors and switches as well as accelerometers for airbags, vehicle control, pacemakers and games. They are also used in the construction of microactuators for data storage, read/write heads, and are used in all-optical switches to forward light beams by reflecting them to the appropriate output port.

SUMMARY OF THE INVENTION

An apparatus is described comprising: an aircraft having one or more control surfaces; and one or more micro-electro mechanical systems ("MEMS") actuators to control the movement of the one or more control surfaces.

BRIEF DESCRIPTION OF THE DRAWINGS

A better understanding of the present invention can be obtained from the following detailed description in conjunction with the drawings, in which:

FIGS. 5a-c illustrates the operation of the rudder according to one embodiment of the invention.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

Figure 1:
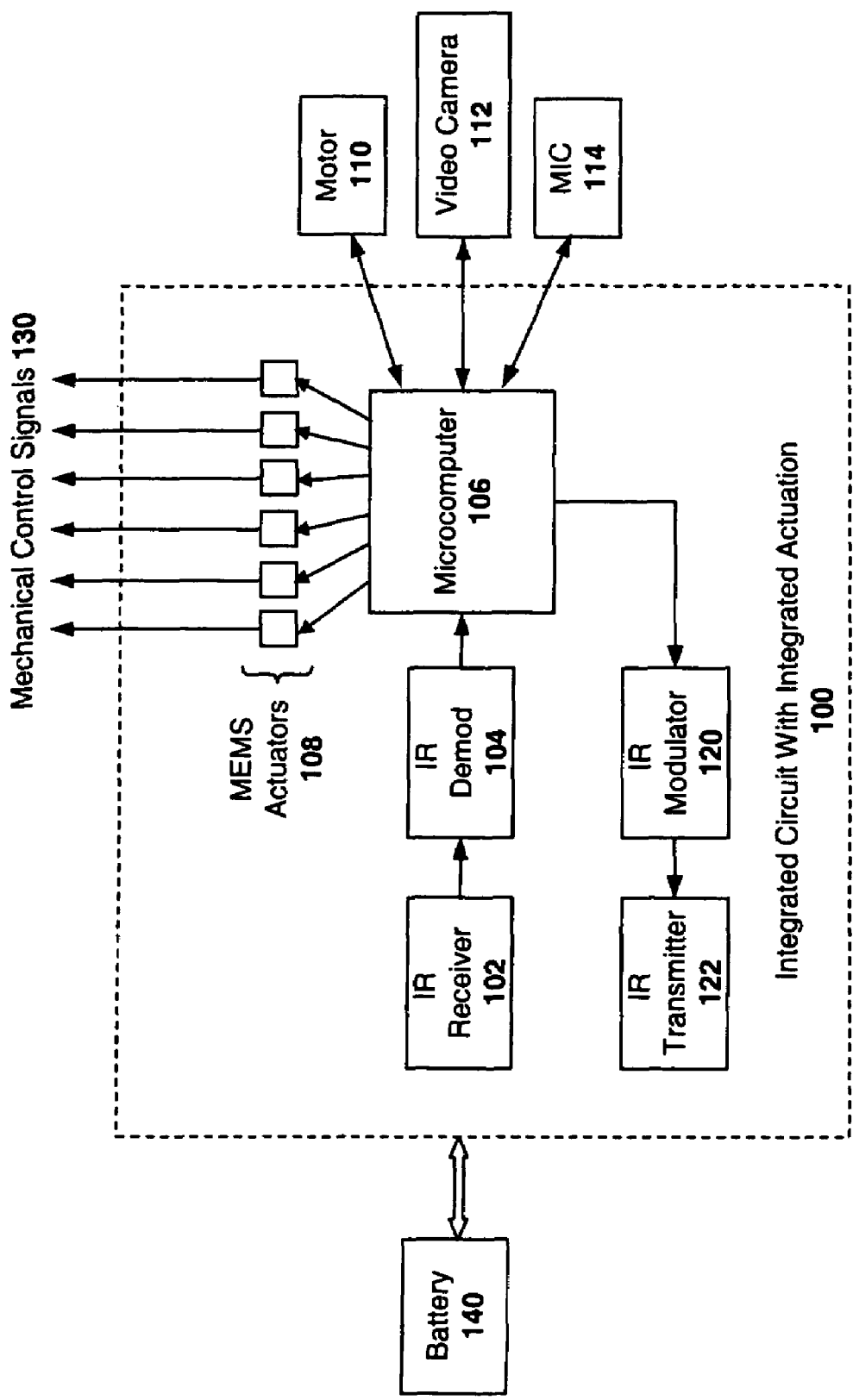
FIG. 1 illustrates an integrated circuit with integrated actuation according to one embodiment of the invention.

One embodiment of the invention is a miniature airplane which uses a Micro-Electro Mechanical Systems ("MEMS")-based control system. Referring to FIG. 1, in one embodiment, a single integrated circuit 100 is employed which includes a set of embedded MEMS-based actuators 108 for providing control signals to the various mechanical control components of the miniature airplane including the two ailerons on the left and right wings, the two elevators, and the rudder. It will be appreciated by those of skill in the art that the use of MEMS-based actuation allows for a significantly smaller airplane size than was previously possible. Moreover, it allows all logic and control functions to be embedded within a single integrated circuit 100, thereby significantly reducing the cost required to manufacture the airplane.

Figure 9:
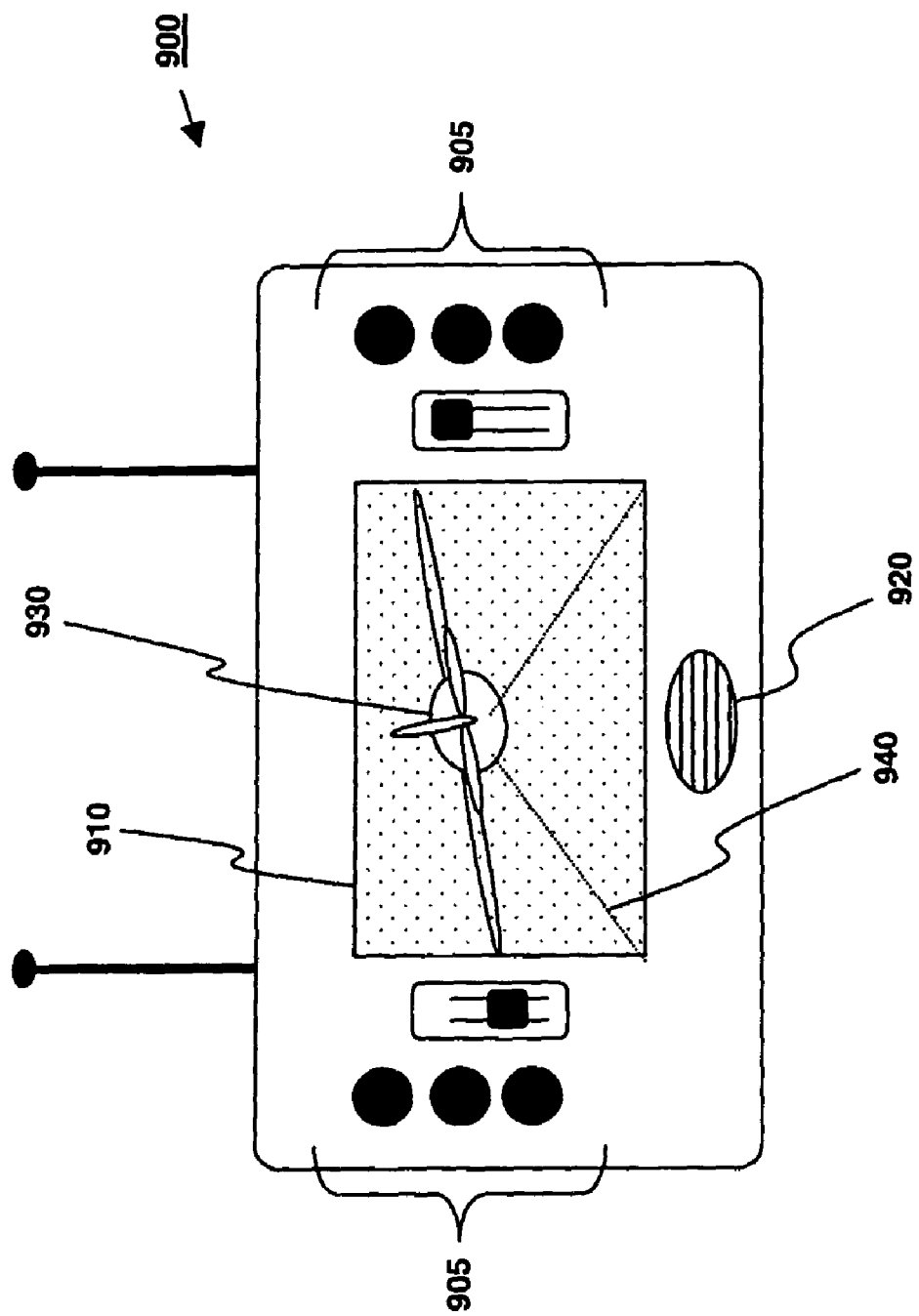
FIG. 9 illustrates a remote control apparatus according to one embodiment of the invention.

The integrated circuit 100 illustrated in FIG. 1 also includes an IR receiver 102 and an IR demodulator 104 for receiving and demodulating infrared control signals, respectively, transmitted from a remote control device 900 such as that shown in FIG. 9. A microcomputer 106 translates the control signals received by the IR receiver 102 into MEMS-based control signals for controlling the MEMS actuators 108. In response, the MEMS actuators 108 operate the various control surfaces required to fly the airplane, as described in detail below.

In one embodiment, an IR modulator 120 and an IR transmitter 122 are also embedded on the integrated circuit 100 to provide a communication channel back to the remote control device 900. Other components employed within the embodiment of the miniature airplane illustrated in FIG. 1 include a motor 110 for powering the airplane, a video camera 112 for capturing video images, and a microphone 114 for capturing audio. In one embodiment, each of these elements is also under the control of the microcomputer 106. For example, the microcomputer 106 may increase or decrease the throttle on the motor 110, or may enable/disable the video camera 112 and/or the microphone 114 based on control signals transmitted by the user from the remote control device 900.

In one embodiment, the microcomputer 106 is an ARM-based microcontroller or similar low power processor which includes an embedded memory for storing program code and data. Various types of memory may be employed within the microcomputer 106 and/or the integrated circuit 100 including volatile memory such as random access memory ("RAM") and non-volatile memory such as read only memory ("ROM") and/or Flash™ memory. Of course, the underlying principles of the invention are not limited to any particular memory configuration or any particular type of microcomputer.

In one embodiment, the integrated circuit 100 and other components within the miniature airplane are powered by a battery 140. Various different battery technologies and battery styles may be used. In one particular embodiment, the battery 140 is a lithium-ion battery such as the type used in fishing lures. Such batteries are particularly suited for the present invention because their thin, long shape allow them to fit within the long, thin main compartment of the miniature airplane (e.g., such as National part number BR425).

In one embodiment, the video captured by the video camera 112 and the audio captured by the microphone 114 are first digitized and then compressed using specified video and/or audio compression algorithms. In this embodiment, the analog-to-digital ("A/D") conversion logic required to digitize the audio/video signals and the compression logic required to compress the signals are embedded directly on the integrated circuit 100. Once encoded and compressed, the audio and video signals may be modulated by IR modulator 120 using a specified modulation scheme such as, for example, Quadrature Amplitude Modulation ("QAM"). The signals are then transmitted to the remote control device 900 by the IR transmitter 122.

Alternatively, in one embodiment, analog video and audio signals generated by the video camera 112 and the microphone 114 may be modulated directly by IR modulator 120 using a specified analog modulation technique (e.g., PAL, NTSC). Amplitude Modulation or Frequency Modulation could be utilized, for example. The modulated analog signal is then transmitted by transmitter 122.

Figure 2:
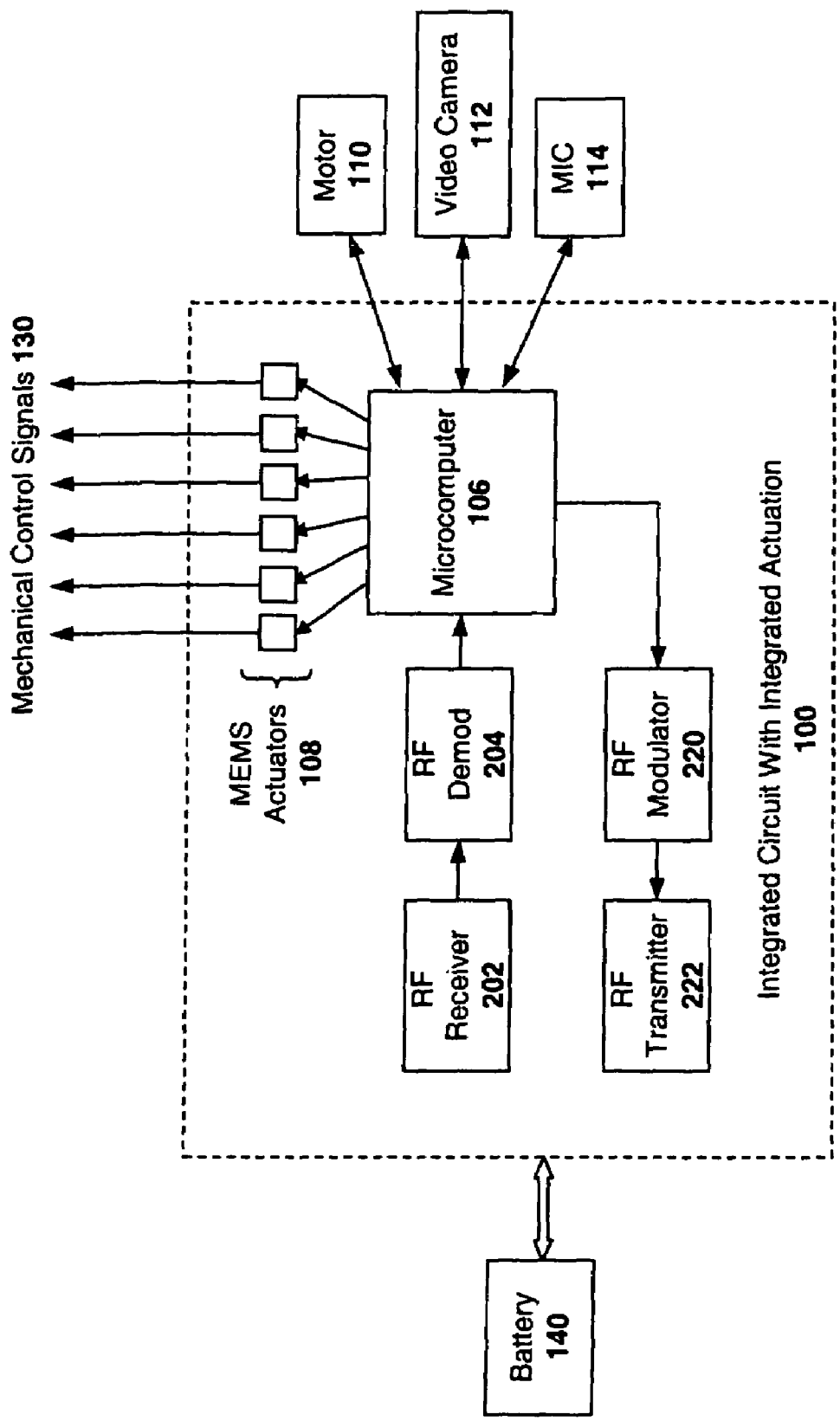
FIG. 2 illustrates an integrated circuit with integrated actuation according to another embodiment of the invention.

As illustrated in FIG. 2, in one embodiment, a radio frequency ("RF") receiver 202 and demodulator 204 are employed in lieu of, or in addition to, the IR receiver 102 and demodulator 104. Similarly, an RF modulator 220 and RF transmitter 222 may be employed in lieu of, or in addition to, the IR modulator 120 and IR transmitter 122, respectively. Although RF is more expensive than IR, it has the benefit of being more transmissive through solid opaque objects and not impacted by bright sunlight.

The interconnections between the MEMS actuators 108 and the control surfaces employed in one embodiment of the miniature airplane are illustrated in FIGS. 3 through 8c. Five different aeronautical control surfaces are controlled by the MEMS actuators: the right and left ailerons 363 and 364, respectively; the right and left elevators 360 and 361, respectively; and the rudder 362. Although the MEMS actuators 380-384 are illustrated as discrete units in FIGS. 3 through 8c for the purpose of illustration, it will be understood by those of skill in the art that all of the MEMS actuators 380-384 may be embedded on the same integrated circuit chip 100 as the microcomputer 106 and/or other logical components of the miniature airplane illustrated in FIGS. 1 and 2.

Figure 3:
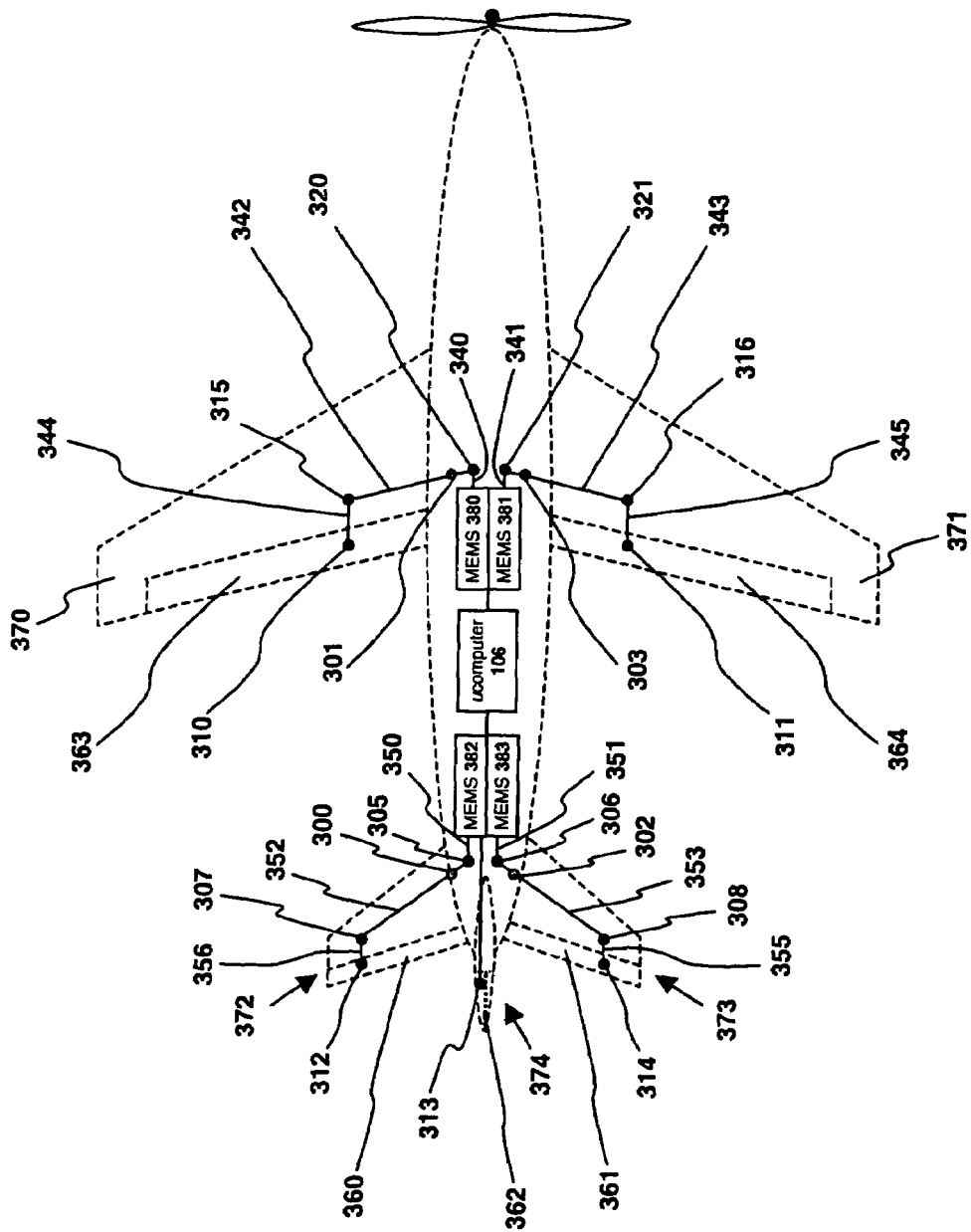
FIG. 3 illustrates mechanical interconnections within a miniature airplane according to one embodiment of the invention.
Figure 4A:
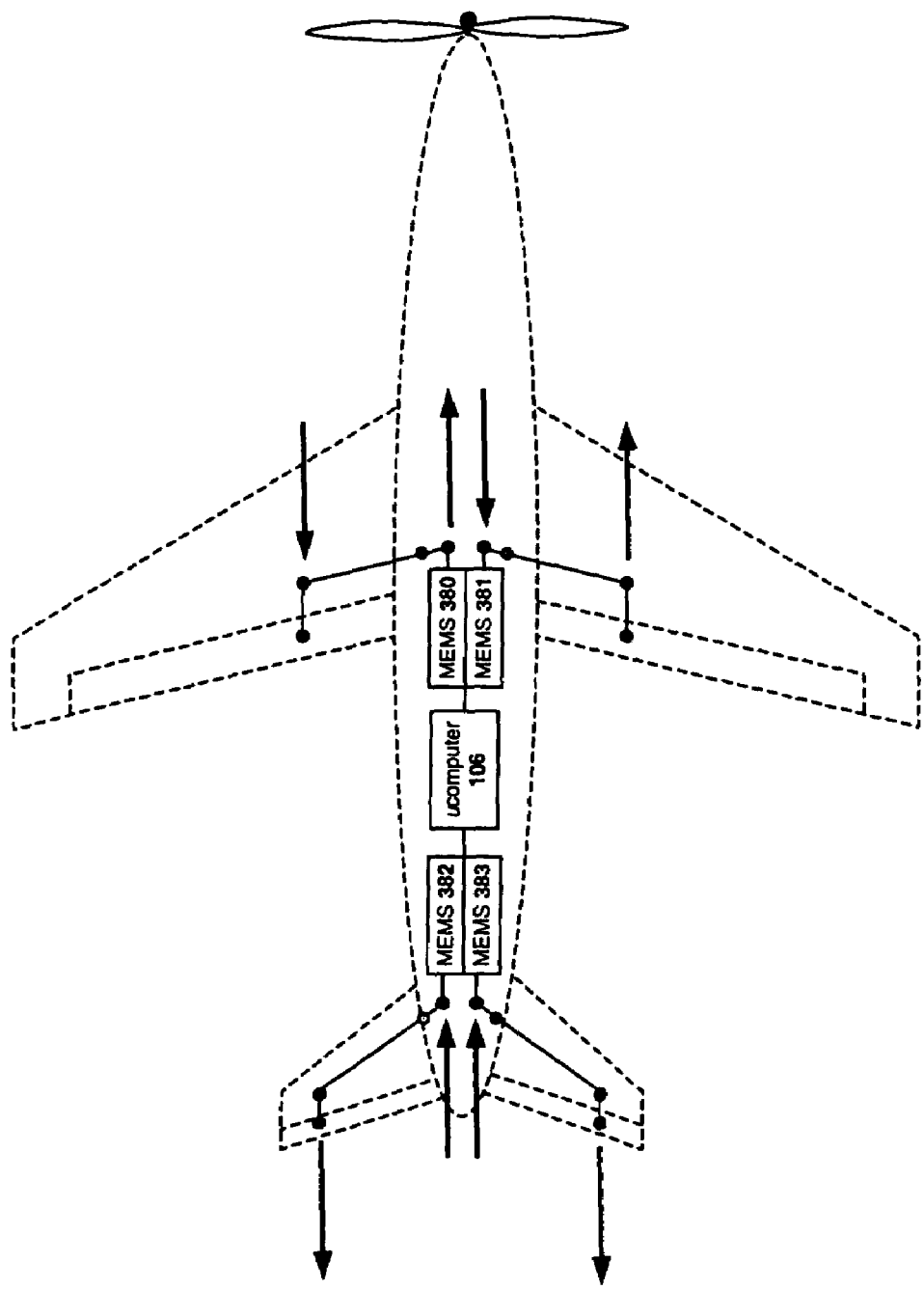
FIGS. 4a-b illustrate the operation of the ailerons and elevators according to one embodiment of the invention.

The operation of the ailerons 363 and 364 according to one embodiment of the invention will now be described with respect to FIGS. 3 and 4a-b which show a top view of the mechanical components of the miniature airplane, and FIGS. 6a-c which show a side vide of the wing 370 and associated aileron 363. Note that although the discussion below focuses on the left wing 370 and aileron 363, the same basic principles apply to the right wing 371 and aileron 364.

Figure 6A:
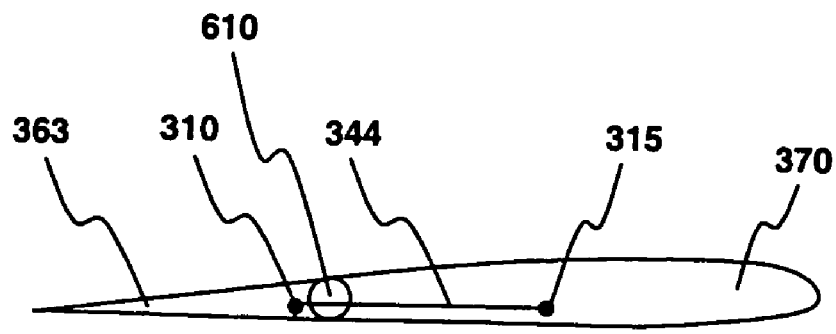
FIGS. 6a-c illustrate aileron operation from a side view according to one embodiment of the invention.

As a starting point, the aileron 363 is in the state shown in FIG. 6a. In response to control signals from the remote control device 900 indicating a right turn, the microcomputer 106 directs the MEMS actuator 380 to generate a force along linkage 340 in a "forward" direction as indicated in FIG. 4a (i.e., generally directed towards the front of the airplane). The force is translated to a second linkage 344 through a lever 342. Linkage 340 and linkage 344 are both rotatably coupled to the lever 342 at points 320 and 315. The lever 342 is pivotally coupled to the fuselage of the airplane at a pivot point 301. Based on the positioning of the pivot point 301, a relatively small displacement of linkage 340 generated by the MEMS actuator 380 will generate a significantly larger displacement of linkage 344.

Figure 6B:
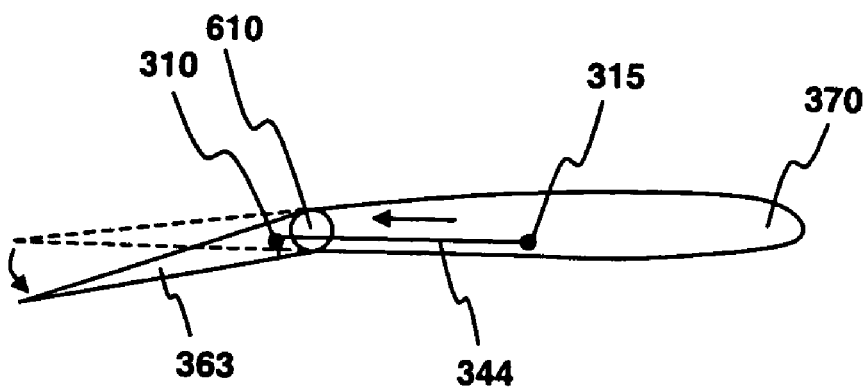
Figure 6C:
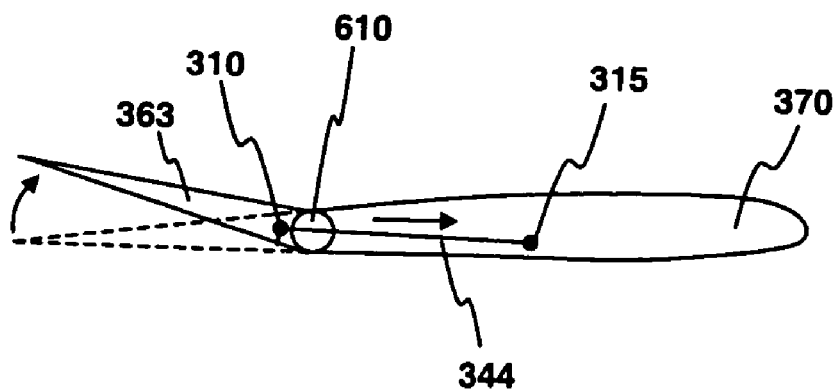

The side view of the aileron 363 and wing 370 shown in FIGS. 6a-c illustrate the mechanical operation of the aileron 363 in greater detail. The aileron 363 is rotatably coupled to linkage 344 at a point 310. In addition, the aileron 363 is rotatably coupled to wing 370 at a point of rotation 610. Accordingly, in response to the force translated through the linkage 344, as indicated in FIG. 6b, the aileron 363 rotates around the rotation point 610 in a counter-clockwise motion, causing the force of the air to direct the airplane into a banked right turn.

Figure 4B:
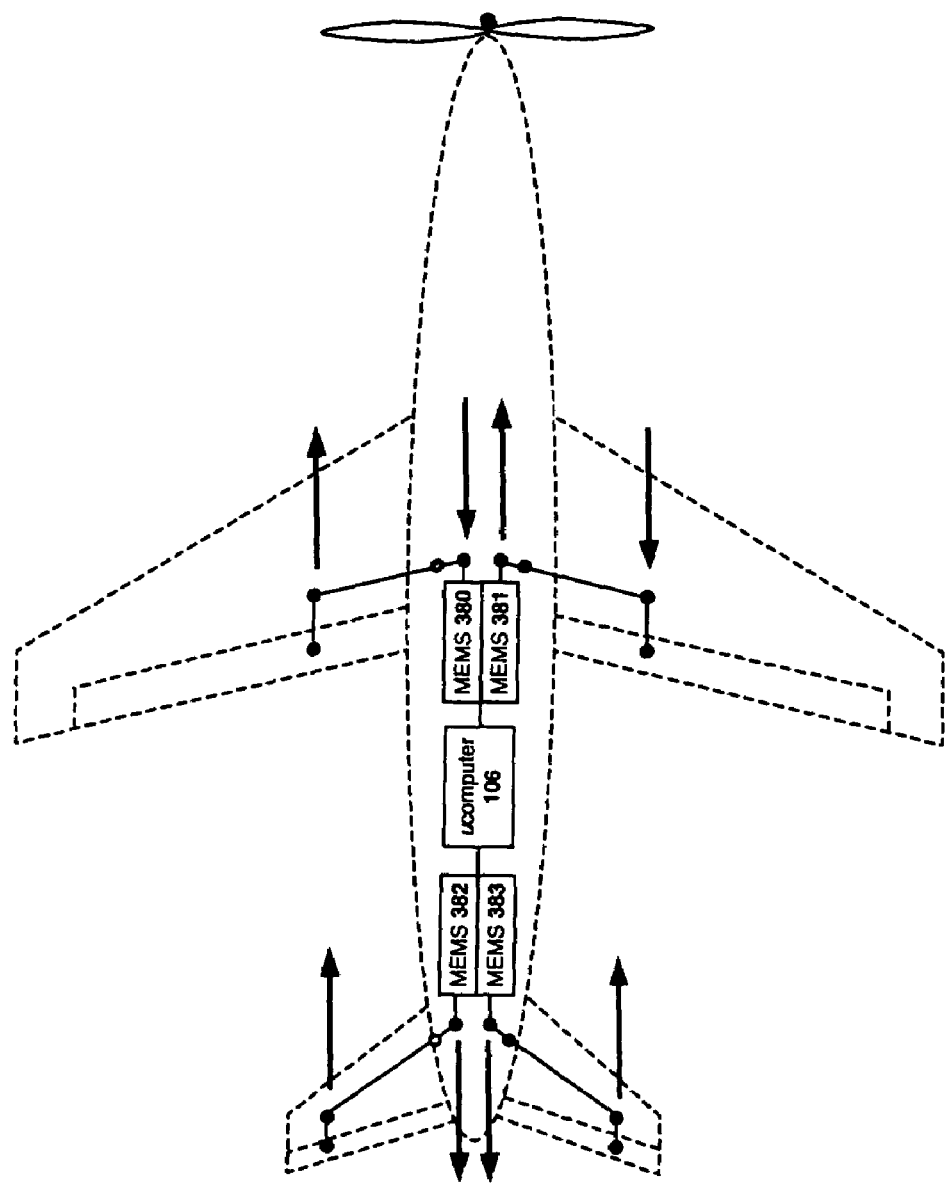

Similarly, in response to control signals from the remote control device 900 indicating a left turn, the microcomputer 106 directs the MEMS actuator 380 to generate a force along linkage 340 in a "backward" direction (i.e., generally directed towards the tail of the airplane) as indicated in FIG. 4b. In response, the lever 342 forces linkage 344 in a forward direction, causing the aileron 363 to rotate around rotation point 610 in a clockwise motion as shown in FIG. 6c.

Although described above as a single functional unit, MEMS actuator 380 may actually be comprised of a plurality of miniature actuators. For example, a first MEMS actuator may be configured to direct the aileron 363 in a counter-clockwise direction as shown in FIG. 6b and a second MEMS actuator may be configured to direct the aileron 363 in a clockwise direction as shown in FIG. 6c. Furthermore, multiple MEMS actuators may be dedicated to moving the aileron 363 in each direction. For example, the triggering of different numbers of MEMS actuators in a particular direction may cause different degrees of movement of the aileron 363 (e.g., 1 actuator=3 deg; 2 actuators=6 deg, . . . etc).

The aileron 364 on the right wing 371 operates in the same general manner as just described but the forces exerted by MEMS actuator 381 for a left and right turn are opposite in direction those described above. For example, as illustrated in FIG. 4a-b, for a right turn, the microcomputer 106 directs the MEMS actuator 381 to generate a force along linkage 341 in a backward direction, and for a left turn the microcomputer 106 directs the MEMS actuator 381 to generate a force along linkage 341 in a forward direction.

The interface between the elevators 360 and 361 and the MEMS actuators 382 and 383, respectively, operates according to the same general principles described above for the ailerons 363 and 364. The following description will focus on elevator 360 although the same principles apply to both elevators 360 and 361.

In response to control signals from the remote control device 900 indicating that the airplane should increase its elevation, the microcomputer 106 directs the MEMS actuator 382 to generate a force along linkage 350. As illustrated in FIG. 4b, the force is directed generally towards the tail of the airplane. The force is translated to linkage 356 through lever 352. As illustrated, levers 352 and 353 are pivotally coupled to the fuselage at pivot points 300 and 302, respectively.

Figure 7A:
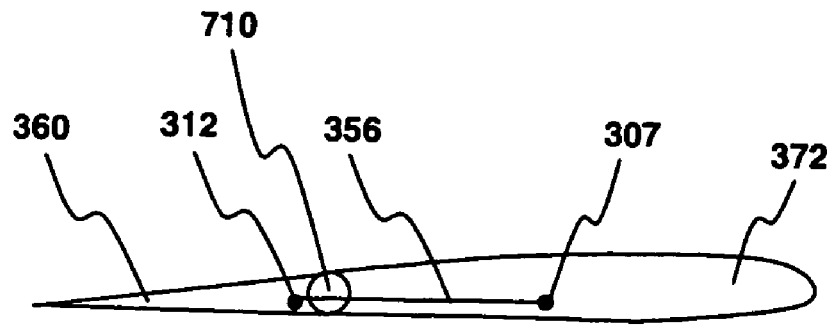
FIGS. 7a-c illustrate elevator operation from a side view according to one embodiment of the invention.
Figure 7B:
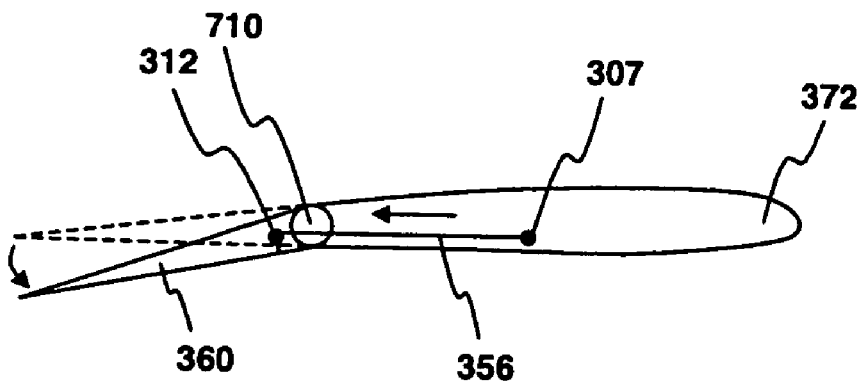
Figure 7C:
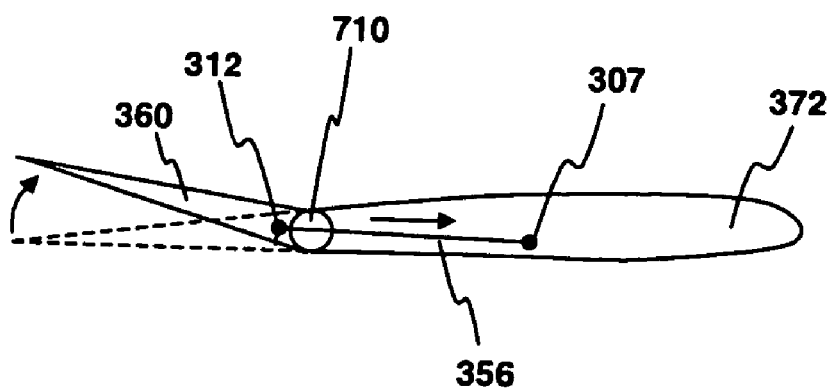

FIGS. 7a-c illustrate a side view of the elevator 360 and back wing 372. The elevator 360 is rotatably coupled to linkage 356 at a point 312. In addition, the elevator 360 is rotatably coupled to wing 372 at a point of rotation 710. Accordingly, in response to the force generated by the linkage 344 as indicated in FIGS. 4a and 7b (i.e., towards the left in the figure), the elevator 360 rotates around the rotation point 710 in a counter-clockwise motion, directing the airplane in a downward direction (i.e., due on the force of the air against the elevator 360). Conversely, in response to the movement of the linkage 344 as indicated in FIGS. 4b and 7c, the elevator 360 rotates around the rotation point 710 in a counter-clockwise motion, directing the airplane in an upward direction.

Figure 5A:
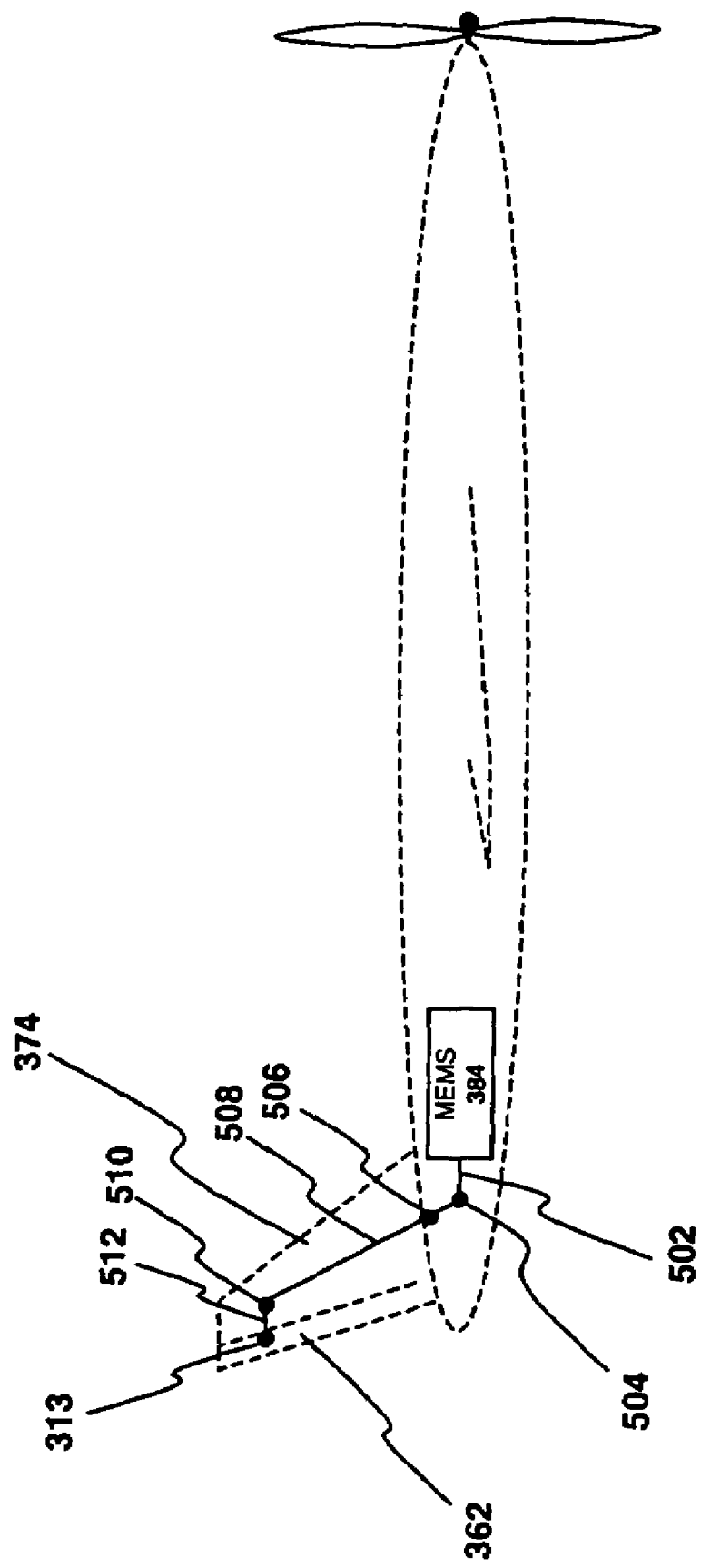
Figure 8A:
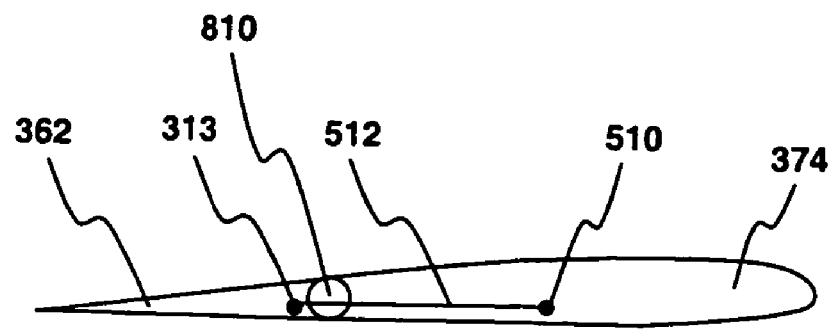
FIGS. 8a-c illustrate rudder operation from a top view according to one embodiment of the invention.
Figure 8B:
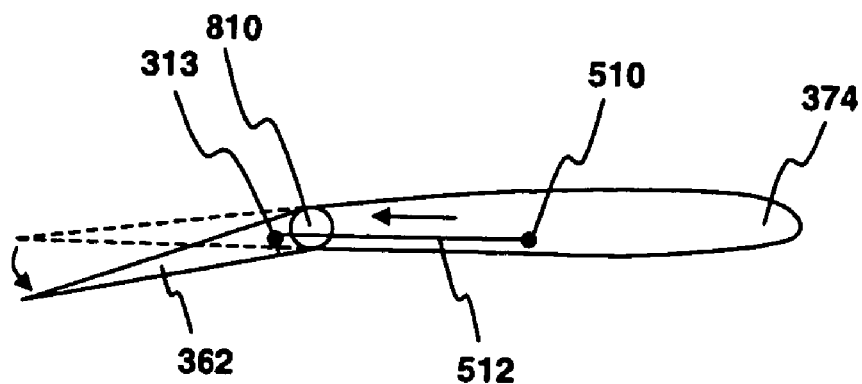
Figure 8C:
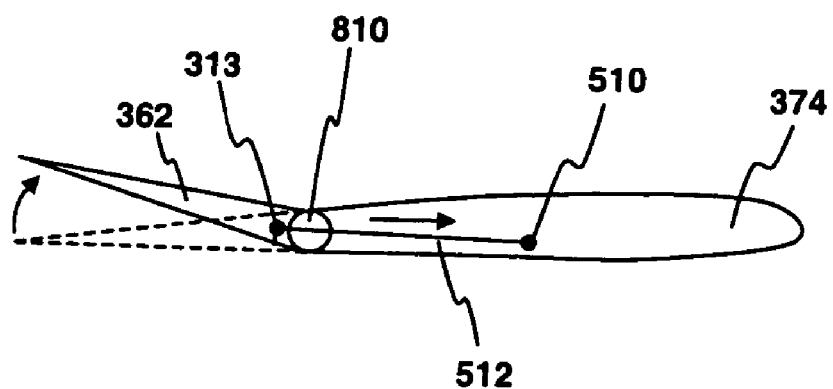

The operation of the rudder 362 according to one embodiment of the invention will now be described with respect to FIG. 5a-c, which show the airplane and rudder 362 from a side view, and FIGS. 8a-c which show the operation of the rudder 362 from a top view. As a starting point, the rudder 362 is in the state shown in FIG. 8a in which it does not generate a leftward or rightward force on the tail 374. In response to control signals from the remote control device 900 indicating a change in yaw to the right (i.e., directing the nose of the airplane to the right), the microcomputer 106 directs the MEMS actuator 384 to generate a force along linkage 502 in a forward direction as indicated in FIG. 5b (i.e., generally towards the front of the airplane). The force is translated to a second linkage 512 through a lever 508 as illustrated. Linkage 512 and linkage 502 are both rotatably coupled to the lever 508 which is pivotally coupled to the body of the airplane at a pivot point 506. As mentioned above, based on the positioning of the pivot point 506, a relatively small displacement of linkage 502 generated by the MEMS actuator 384 will generate a significantly larger displacement of linkage 512. The motion shown in FIG. 5b corresponds to the motion shown in FIG. 8b, in which the rudder 362 rotates towards the right side of the airplane, directing the nose of the airplane to the right.

Similarly, in response to control signals from the remote control device 900 indicating a change in yaw to the left, the microcomputer 106 directs the MEMS actuator 384 to generate a force along linkage 502 in a backward direction (i.e., directed towards the tail of the airplane) as indicated in FIG. 5c. The motion shown in FIG. 5c corresponds to the motion shown in FIG. 8c, in which the rudder 362 rotates towards the left side of the airplane, directing the nose of the airplane to the left.

Various known types of hardware may be used to rotatably couple the various linkages described herein (e.g., linkage 342 to 344; linkage 352 to 356, . . . etc). For example, an eye or opening may be formed at the end of each of the two linkages and a screw, bolt or other attachment hardware may be inserted through the eye of the two linkages to couple the two linkages together. Similarly, various known hardware may be used to pivotally coupled the levers described herein to their respective pivot points (e.g., pivot point 300, 301, . . . etc). For example, an eye or opening may be formed on each of the levers at the point where the pivoting mechanism is desired. A screw or bolt may then be used to pivotally secure the lever to the fuselage of the airplane (or to another stationary structure on the airplane such as the wing 370).

The different linkages and levers described herein may be formed from a variety of different chemical components and manufacturing processes while still complying with the underlying principles of the invention. Preferably, the linkages and levers are made of a lightweight but rigid material such as aluminum, titanium or a synthetic polymer such as plastic. Various alternate substances may be used to create the mechanical components described herein while still complying with the underlying principles of the invention.

In one embodiment, the MEMS actuators described herein are interdigitated-electrode capacitive microactuators. As is known in the art, this type of MEMS actuator is a capacitor-based actuator which can generate a relatively large amplitude displacement parallel to the capacitor plate. Alternatively, other MEMS actuator types may be used including, by way of example, but not limitation, standard parallel-plate capacitive microactuators and torsional capacitive microactuators.

Figure 10:
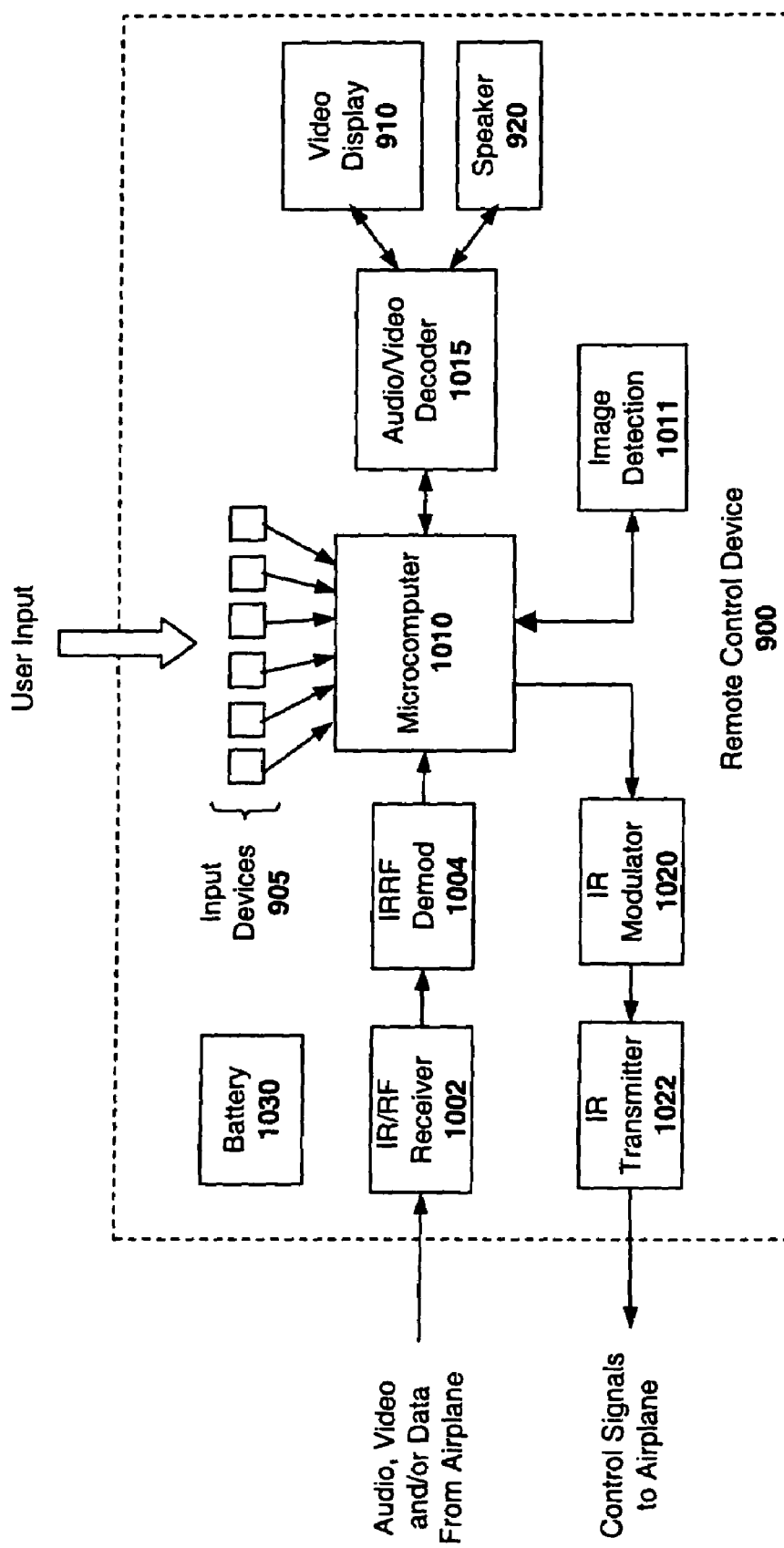
FIG. 10 illustrates one embodiment of a hardware architecture employed within the remote control apparatus.

One embodiment of a remote control device 900, illustrated in FIGS. 9 and 10, is comprised of a video display 910 for rendering video images transmitted from the miniature airplane and a speaker 920 for rendering audio transmitted form the miniature airplane. The remote control device 900 also includes a series of input devices 905 for controlling the airplane as described above.

As illustrated in FIG. 10, one embodiment of the remote control device 900 includes an IR or RF receiver 1002 and an IR or RF demodulator 1004 for receiving and demodulating, respectively, audio, video and control signals transmitted from the miniature airplane or other remote control devices (as described below). A microcomputer 1010 then processes the audio, video and control signals in addition to control signals generated from the input devices. In one embodiment, a separate audio/video decoder module 1015 is configured on the remote control device 900 to decode the audio and/or video signals prior to rendering the audio and/or video on the speaker 920 and display 910, respectively. An IR modulator 1020 and an IR transmitter 1022 are also configured within the remote control device to provide a communication channel to the miniature airplane over which control signals are transmitted.

In one embodiment, an image detection module 1011 is configured within the remote control device 900 to detect certain specified images and/or image characteristics. For example, as described below, the image detection module 1011 may recognize the presence of another airplane within the video display 910 based on the airplane's color or other visual characteristics of the airplane (e.g., based on bar codes painted on the airplane).

Figure 11A:
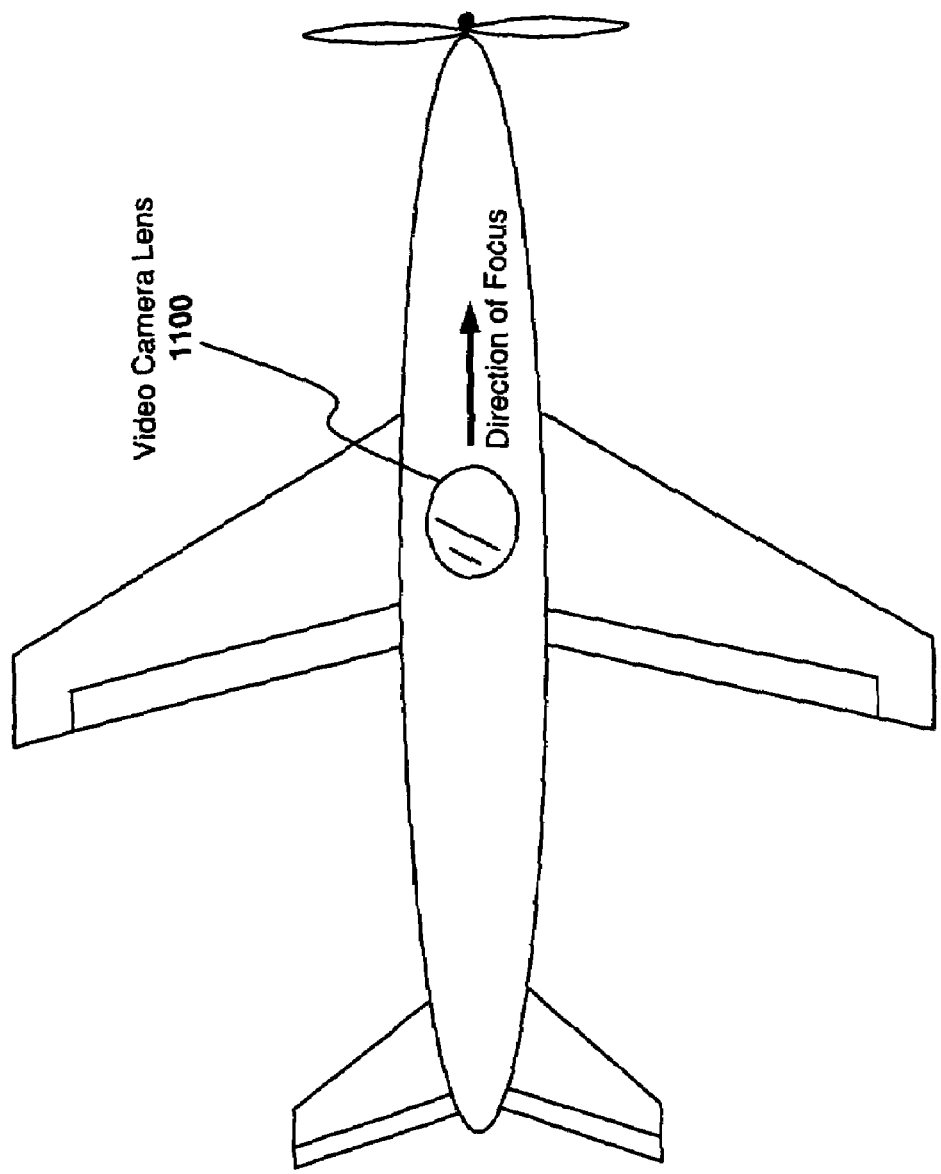
FIGS. 11a-b illustrate the configuration of a video camera lens according to one embodiment of the invention.
Figure 11B:
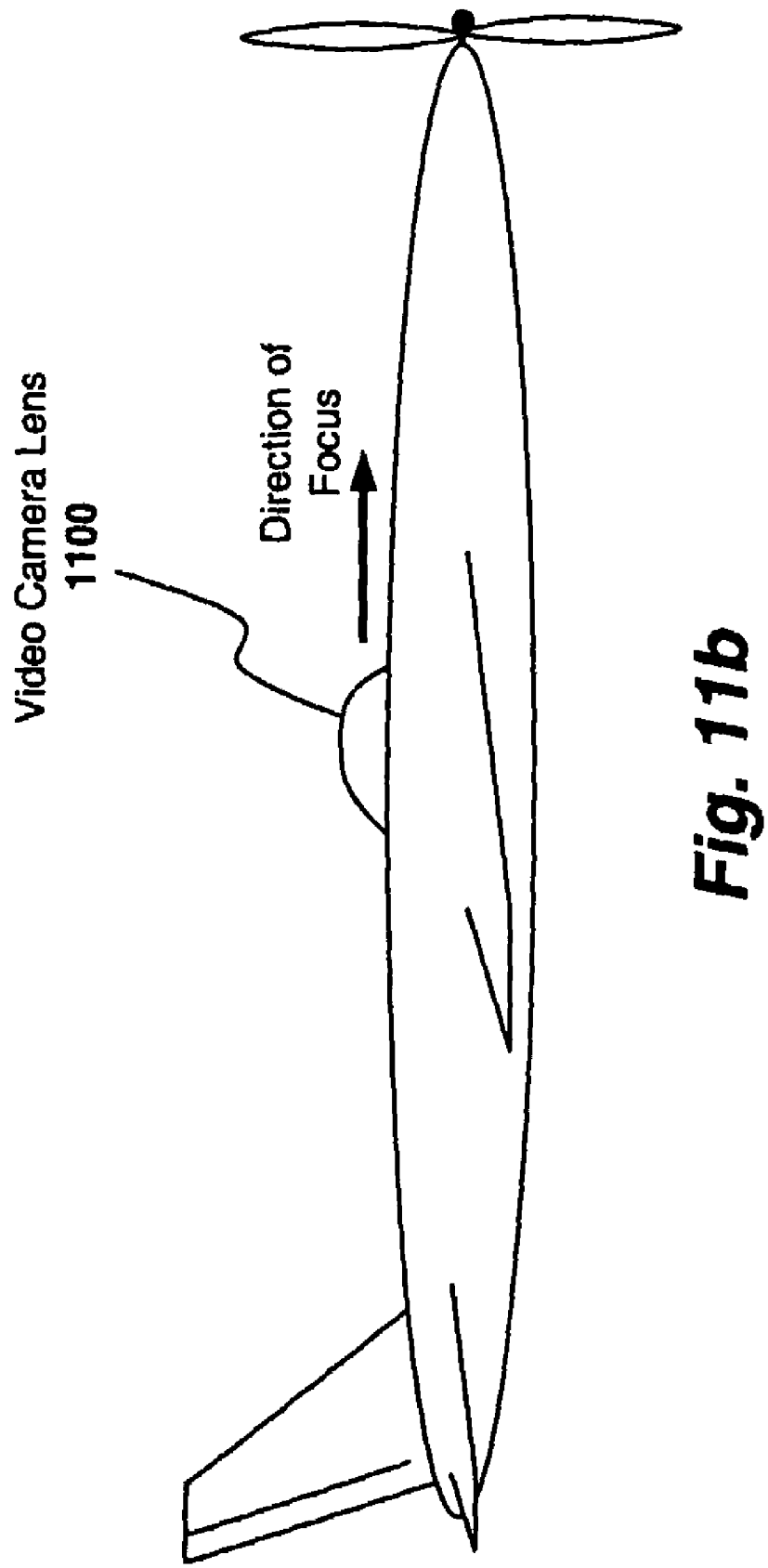

In one embodiment, in response to a user command from the remote control device 900, the video camera 112 configured on the airplane continually captures and transmits video images back to the remote control device. In one embodiment, the video camera lens 1100 is positioned on the top of the airplane as illustrated in FIGS. 11a-b. However, the video camera lens 1100 may be positioned in various different points on the airplane while still complying with the underlying principles of the invention. Moreover, multiple lenses may be employed on the airplane (e.g., one on top and another on the bottom).

In one embodiment, the lens 1100 is focused towards the front of the airplane to generate video images from the perspective of a person sitting in the cockpit of the airplane.

Thus, the individual controlling the airplane from the remote control device 900 will have the same perspective as if he/she were actually flying the airplane. In one embodiment, the user may change the direction of focus of the lens using the remote control device 900.

Figure 12:
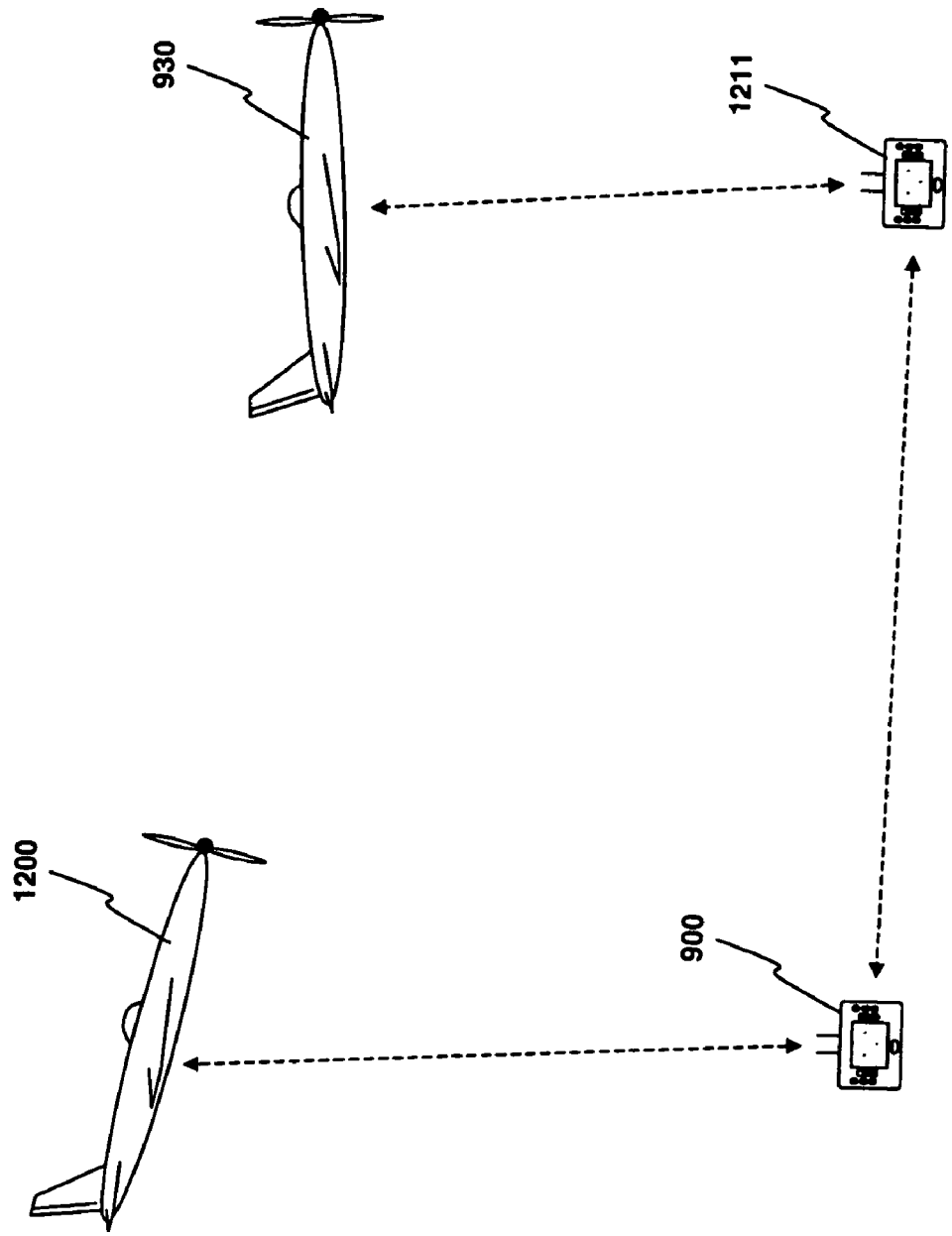
FIG. 12 illustrates communication between two or more remote control devices according to one embodiment of the invention.

As illustrated in FIG. 12, multiple airplanes 930, 1202 and remote control devices 900, 1211 may be operated together. To avoid interference between the two remote control devices 900, 1211 different communication frequencies or "channels" may be automatically selected. Alternatively, the same frequency may be used but an arbitration algorithm may be implemented to ensure that only one device can transmits signals at a given time.

In one embodiment, the two or more remote control devices 900, 1211 communicate directly with one another to augment the video and/or audio rendered by the remote control devices 900, 1211. For example, as illustrated in FIG. 9, a dogfight between two airplanes may be simulated. When an airplane 930 comes into view in a particular area of the screen the user may "fire" at the airplane 930, causing the remote control device 900 to generate a video image of bullets 940 directed towards the airplane 930 as illustrated in FIG. 9. The microcomputer 1010 may be programmed to recognize a "hit" based on the location of the airplane 930 and the location of the bullets.

The image detection module 1011 in the remote control device 900 can identify a "hit" through a number of techniques. For example, in one embodiment, each miniature airplane is colored with a distinctive color which is not likely to appear in the surrounding area (e.g. bright pink). The image detection module 1011 then searches for that color (or a close approximation of that color) in the incoming video frames. Moreover, distinctive bar code patterns on different sides of the airplane can be identified by the image detection module 1011. If multiple bar codes are used on different sides of the airplane, the image detection module 1011 may detect the specific side of the airplane is in view, and what its orientation is. In one embodiment the image detection module 1011 is comprised of software executed by the microcomputer. Alternatively, the image detection module 1011 may be embodied in hardware (e.g., as an ASIC).

In response to detecting a hit, the remote control device 900 may transmit data indicating a hit to the remote control device 1211 associated with the airplane 930 which was hit. The data may include the specific area of the airplane which was hit. In response, the remote control device 1211 may generate graphics indicating that the airplane 930 has been hit (e.g., an explosion) and/or may disable control of the area of the plane on which the hit was registered (e.g., the left aileron). Various other types of interactive data may be transmitted between the two remote control devices 1210, 1211 while still complying with the underlying principles of the invention.

Figure 13A:
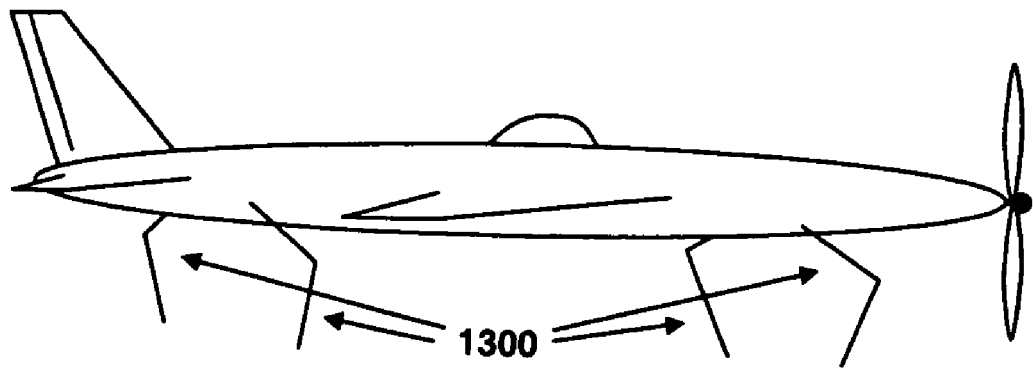
FIGS. 13a-b illustrate moveable legs employed on one embodiment of the miniature airplane.
Figure 13B:
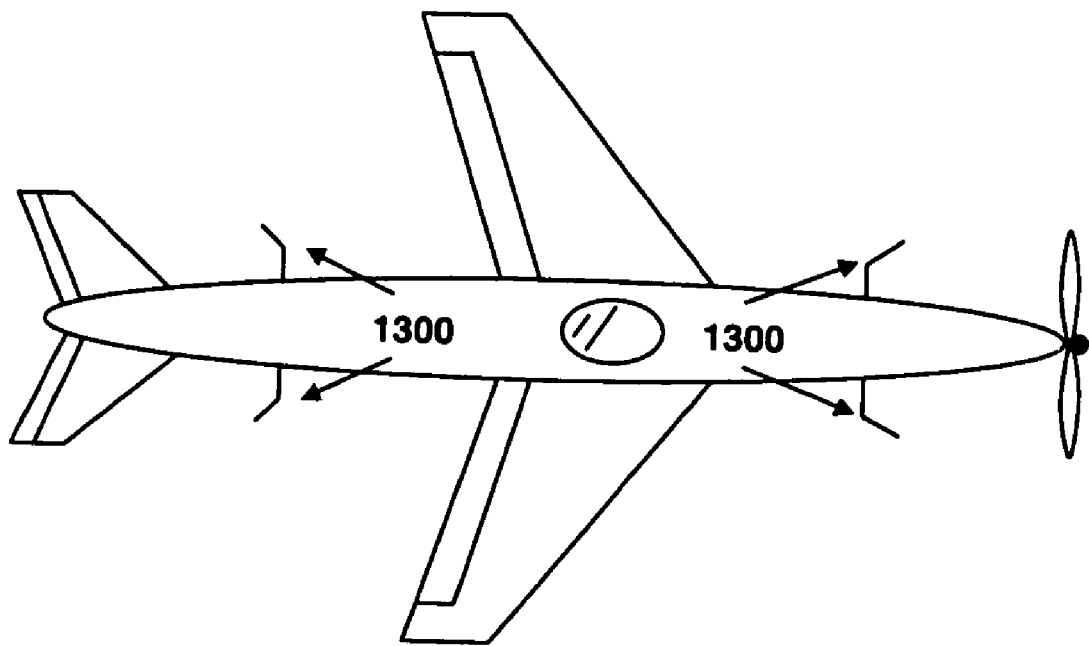
Figure 14:
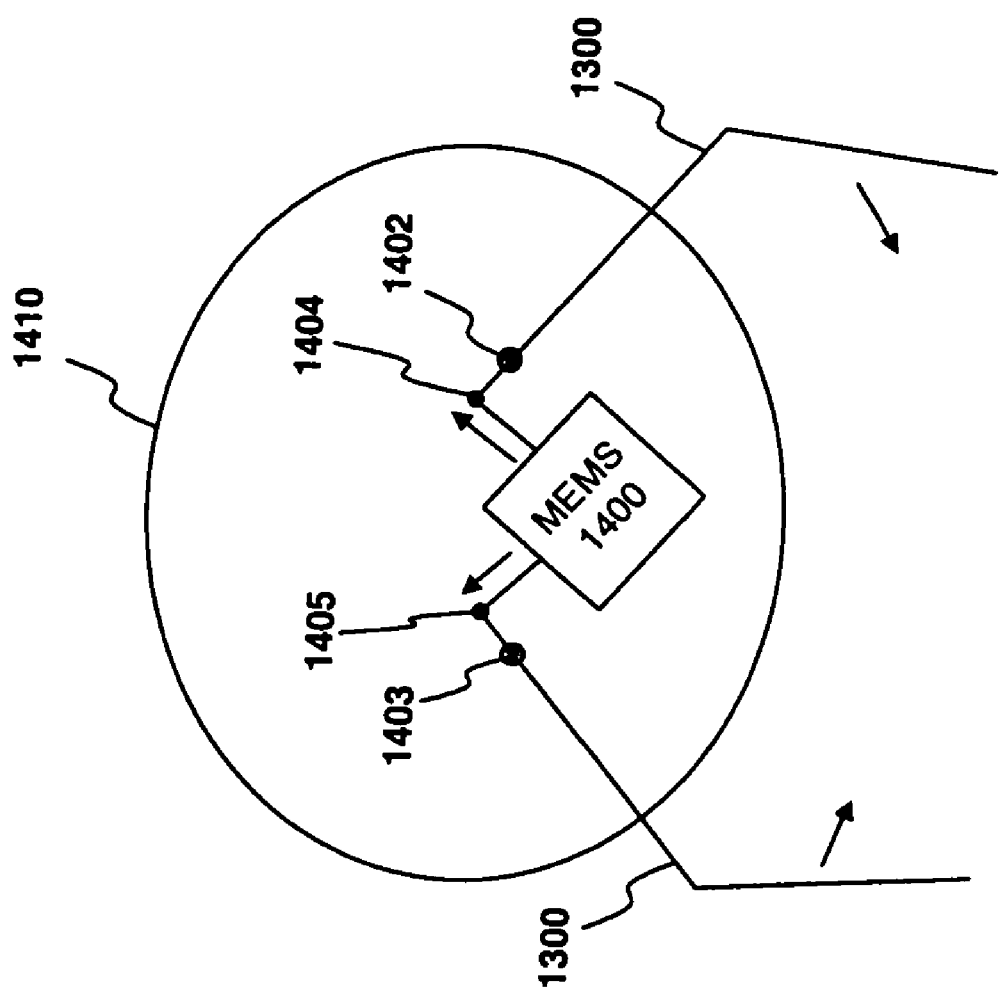
FIG. 14 illustrates control components for manipulating the legs according to one embodiment of the invention.

In one embodiment, illustrated in FIGS. 13a-c, a series of legs 1300 may be configured on the miniature airplane to allow the airplane to grip and attach to a surface such as a wall or ceiling. FIG. 13c shows a view from the front of the airplane. As illustrated in FIG. 13c, in one embodiment, one or more MEMS actuators 1400 may be configured to direct the legs 1300 towards one another, into a gripping motion. The MEMS actuator(s) 1400 generates a force along linkages 1406-1407 as indicated. Linkages 1406-1407 are rotatably coupled to the legs 1300 at points 1404-1405 and each of the legs are pivotally coupled to the fuselage 1410 at pivot points 1402-1403. Accordingly, the force generated through linkages 1406-1407 is translated through the legs 1300 of the airplane as indicated. Based on the positioning of the pivot points 1402-1403, a relatively small displacement of the linkages 1406-1407 produced by the MEMS actuator(s) 1400 will generate a significantly larger displacement of the legs 1300, thereby allowing the miniature airplane to grip to surfaces such as walls or ceilings.

Using the integrated MEMS control system and other features described herein, extremely small airplanes may be manufactured (e.g., on the scale of 1 inch in length or less). Accordingly, the miniature airplane with legs 1300 may be particularly suitable for surveillance applications. For example, the airplane may be directed into a particular room and temporarily gripped to a ceiling or wall of the room in response to commands transmitted from the remote control device 900. The airplane may then transmit audio and video back to the remote control device 900. When surveillance is complete, the user may direct the airplane out of the room via the remote control device 900. Of course, various applications other than surveillance are contemplated within the scope of the present invention.

Throughout the foregoing description, for the purposes of explanation, numerous specific details were set forth in order to provide a thorough understanding of the present system and method. It will be apparent, however, to one skilled in the art that the system and method may be practiced without some of these specific details. For example, although the embodiments of the invention described above focus on an "airplane," the underlying principles of the invention may be employed on a variety of different types of aircraft (e.g., helicopters, gliders, . . . etc). Moreover, although the embodiments described above employ a specific linkage/lever system for coupling the MEMS actuators to the control surfaces of the airplane, it will be appreciated by those of skill in the art that the invention may be practiced using various alternate mechanical arrangements. Finally, certain features described above may be implemented on virtually any type of miniature aircraft (e.g., transmitting video and audio to a remote control device), not merely those which employ MEMS actuators. Accordingly, the scope and spirit of the present invention should be judged in terms of the claims which follow.

What is claimed is:

1. A system comprising:
   an airplane comprised of one or more micro-electro mechanical systems ("MEMS") actuators to control a plurality of control surfaces including two ailerons, two elevators and rudder, wherein the airplane further comprises a series of levers cooperatively engaged with the MEMS actuators to translate forces generated by the MEMS actuators into forces directed to move the two ailerons, two elevators and rudder; and
   a remote control apparatus comprising:
   one or more control elements to generate control signals responsive to user input;
   a transmitter to transmit the control signals to the airplane, the control signals interpretable by the airplane to cause movement of the MEMS actuators, thereby causing motion of one or more control surfaces on the airplane; and
   a receiver to receive video transmitted from the airplane, the video generated from a video camera configured on the airplane;
   a video display screen to display the received video; and
   an image detection module to detect the appearance of a specified type of image within the video screen;
   wherein the specified type of image is that of another airplane; and
   wherein, in response to detecting the other airplane at a specified location on the video display; and in response to detecting a specified control signal, the remote control apparatus generates a hit condition, indicating that the other airplane has been hit wherein the image detection module detects the other airplane by detecting the color of the airplane within the video;

wherein the transmitter transmits an indication of the hit condition to another remote control device; the hit condition usable by the other remote control device to generate one or more specified actions; and wherein one of the actions is to disable a particular control surface of the other airplane.

2. The remote control apparatus as in claim 1 wherein the image detection module detects the other airplane by detecting a bar code on the other airplane.

* * * * *